(12) United States Patent
Koehler (10) Patent No.: US 10,202,065 B2
(45) Date of Patent: Feb. 12, 2019

(54) SYSTEM FOR MOVING LOADS COMPRISING A LOCKING ARRANGEMENT THAT IS OPERABLE BY MEANS OF A TRANSPORT VEHICLE

(71) Applicant: Airbus Operations GmbH, Hamburg (DE)

(72) Inventor: Andre Koehler, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 15/685,524

(22) Filed: Aug. 24, 2017

(65) Prior Publication Data

US 2018/0056848 A1 Mar. 1, 2018

(30) Foreign Application Priority Data

Sep. 1, 2016 (EP) .................................. 16186811

(51) Int. Cl.
*B60P 7/13* (2006.01)
*B64C 1/20* (2006.01)
(Continued)

(52) U.S. Cl.
CPC ........ *B60P 7/13* (2013.01); *B64C 1/20* (2013.01); *B64D 9/003* (2013.01); *B65G 13/065* (2013.01);
(Continued)

(58) Field of Classification Search
CPC ........ B60P 7/13; B65G 13/065; B65G 13/075; B64D 9/003; B64D 2009/006
See application file for complete search history.

(56) References Cited

U.S. PATENT DOCUMENTS 3,612,316 A * 10/1971 Baldwin ................... B60P 1/38
198/779
3,698,679 A * 10/1972 Lang ........................ B64D 9/003
104/249
(Continued)

FOREIGN PATENT DOCUMENTS

DE 2735737 2/1979
DE 102013003849 9/2014
(Continued)

OTHER PUBLICATIONS

European Search Report, Oct. 27, 2016, priority document.

*Primary Examiner* — Mark A Deuble
(74) *Attorney, Agent, or Firm* — Greer, Burns & Crain, Ltd.

(57) ABSTRACT

A system for moving loads, in particular within an aircraft, comprising: a cargo hold floor, at least one row of rollers including a plurality of rollers integrated into the floor one behind another, at least one guide rail in the floor extending substantially parallel to the row of rollers, and at least one transport vehicle removably received in and movable along the guide rail. At least one coupling arrangement selectively couples the vehicle with a load arranged on the row of rollers, the load being movable with the vehicle. At least one locking arrangement, in an active state, locking the load relative to the floor and, in a non-active state, allowing a relative movement between the load and the floor. The vehicle operates the locking arrangement according to at least one of the following: so that it assumes the active state; and, so that it assumes the non-active state.

16 Claims, 6 Drawing Sheets

(51) Int. Cl.
    *B64D 9/00* (2006.01)
    *B65G 13/06* (2006.01)
    *B65G 35/06* (2006.01)
    *B65G 47/88* (2006.01)
    *B65G 13/075* (2006.01)
(52) U.S. Cl.
    CPC ........... *B65G 13/075* (2013.01); *B65G 35/06* (2013.01); *B65G 47/8823* (2013.01); *B64D 2009/006* (2013.01)

(56) References Cited

U.S. PATENT DOCUMENTS

| | | | | |
|---|---|---|---|---|
| 3,810,534 A * | 5/1974 | Prete, Jr. | .................... | B60P 7/08 244/137.3 |
| 3,933,101 A * | 1/1976 | Blas | ......................... | B60P 7/13 410/69 |
| 4,077,590 A | 3/1978 | Shorey | | |
| 4,170,292 A | 10/1979 | Lang | | |
| 4,583,896 A * | 4/1986 | Vogg | ...................... | B64D 9/003 244/118.1 |
| 5,000,635 A * | 3/1991 | Jensen | ...................... | B60P 7/13 410/77 |
| 5,004,387 A * | 4/1991 | Jensen | ...................... | B60P 7/13 410/69 |
| 5,265,991 A * | 11/1993 | Herrick | .................. | B64D 9/003 244/118.1 |
| 6,729,818 B1 * | 5/2004 | Yee | ....................... | B60P 7/0815 410/69 |
| 2006/0065786 A1 | 3/2006 | Huber et al. | | |
| 2009/0304482 A1 | 12/2009 | Sanford et al. | | |
| 2010/0143063 A1 | 6/2010 | Dugic | | |
| 2014/0255137 A1 | 9/2014 | Haertel et al. | | |
| 2015/0139746 A1 * | 5/2015 | Britson | .................... | B60P 7/13 410/77 |
| 2015/0225082 A1 * | 8/2015 | Levron | .................... | B64D 9/00 244/137.1 |

FOREIGN PATENT DOCUMENTS

| | | |
|---|---|---|
| EP | 1527993 | 5/2005 |
| WO | 2008091287 | 7/2008 |
| WO | 2014049590 | 4/2014 |

* cited by examiner

FIG 9

# SYSTEM FOR MOVING LOADS COMPRISING A LOCKING ARRANGEMENT THAT IS OPERABLE BY MEANS OF A TRANSPORT VEHICLE

CROSS-REFERENCES TO RELATED APPLICATIONS

This application claims the benefit of the European patent application No. 16186811.2 filed on Sep. 1, 2016, the entire disclosures of which are incorporated herein by way of reference.

BACKGROUND OF THE INVENTION

The invention relates to a system for moving loads, in particular within an aircraft, as well as a locking arrangement and transport vehicle for being used in the system. Moreover, the invention relates to a method of operating a respective system for moving loads.

In cargo or passenger airplanes, cargo goods are typically accommodated in standardized containers or on standardized pallets, so-called Unit Load Devices (ULDs). For moving the ULDs within the cargo hold, rows of rollers are typically integrated into a cargo hold floor of the cargo hold which, depending on their specific design, may allow for a direction-dependent or direction-independent movement of the ULDs. A cargo hold comprising a respective row of rollers is shown, for example, in EP 1 527 993 B1.

The ULDs can be manually pushed and moved on the row of rollers. Alternatively, an electric drive system comprising so-called Power Drive Units (PDUs) within or next to the row of rollers can be used for automatically moving the ULDs within the cargo hold.

It is further known to, in addition or as an alternative to possible PDUs, use transport vehicles for moving the ULDs along the row of rollers and in parallel to the cargo hold floor. Such transport vehicles are typically only exerted to reaction and/or inertial forces from moving the ULDs, whereas the often significantly higher weight forces are carried by the row of rollers.

A respective solution is known, for example, from DE 10 2013 003 849 A1 in which a transport vehicle is positioned under a load which is arranged on the row of rollers. Following that, a platform of the transport vehicle is lifted to contact the load and allow for a movement thereof. From U.S. Pat. No. 4,170,292 A as well as DE 2 735 737 A1, transport vehicles which are movable by means of external rope winches are known, wherein the vehicles can be selectively brought into contact with a load on the row of rollers for moving same.

When arranging loads, in particular in the form of ULDs, within the cargo hold, it has to be ensured that these are reliably held in place during transport. This specifically relates to the cargo hold of an aircraft which experiences large forces and shocks during takeoff and landing. It is known to use locking arrangements for this purpose, which may be floor-mounted or even integrated into the row of rollers. Yet, for activating these locking arrangements, these have to be either manually operated or each equipped with individual motors and actuation systems. The latter alternative further requires cabling to connect the motors to some form of remote control unit. This way, the system's overall weight and complexity are significantly increased.

SUMMARY OF THE INVENTION

It is thus an object of the present invention to provide a system for moving loads which enables an efficient loading and locking of loads in a cargo hold and/or efficient unloading and unlocking.

The invention will be discussed in the following in particular with reference to possible uses within an aircraft. Nonetheless, it is also conceivable to use the system in a stationary storage area, such as a storage depot.

A system for moving loads, in particular within an aircraft, comprises a cargo hold floor. The cargo hold floor may comprise any suitable material which can withstand the weight of the loads, such as metallic, plastic or composite materials. The loads may comprise standardized containers or palettes, e.g., in the form of ULDs, or any other transport good.

Note that the cargo hold, as well as the cargo hold floor, may relate to a section or area (in particular of an aircraft) which is specifically designed and provided for transporting cargo goods. Yet, it is also conceivable that this relates to a section or area which has been subsequently and/or in particular flexibly or non-temporarily modified for this purpose. For example, it is likewise contemplated to provide the system in a passenger area of an aircraft and, in particular, retrofitting or flexibly changing over such a passenger area to comprise the respective system. This may include arranging the subsequently discussed row of rollers in structures which are usually provided for attaching seat or bench arrangements thereat, such as generally known seat track profiles. Also, this may include forming the row of rollers from single sections or modules with limited lengths which are arranged so as to jointly form an elongated row within the passenger area. Moreover, the row of rollers (or its single modules) may be arranged in a respective seat track profile that is preferably flush with the adjacent floor area of the passenger area. Such seat tracks may also be arranged in the cargo area with single modules attached to it.

The system further comprises at least one row of rollers including a plurality of rollers which are integrated into the cargo hold floor one behind another. The row of rollers may be adapted to enable a movement of the loads parallel to the surface of the cargo hold floor, the surface, e.g., defining a substantially level plane. The rollers of the at least one row may have any suitable form or shape, such as a substantially cylindrical or spherical shape. They may further be mounted and/or define a rotational axis in such a manner, so as to allow for the above-described movement of the loads in parallel to a surface of the cargo hold floor. The rollers may further be dimensioned, so that a load positioned thereon is arranged at a sufficient distance to the surface of the cargo hold floor in order to enable a substantially friction-free movement of the loads in parallel to the surface of the cargo hold floor. The row of rollers may further comprise a central track or frame member which supports the rollers. The track/frame member may take the form of an elongated profile which, optionally, is mounted to the cargo hold floor.

When using the system in an aircraft (and in particular in an airplane), the at least one row of rollers and/or the rollers accommodated therein may further be arranged so as to enable a movement of the loads along a longitudinal axis of the cargo hold and/or airplane (e.g., an axis extending substantially along the flight direction of the airplane). Accordingly, the rollers may be arranged one behind the other along the longitudinal axis of the cargo hold and/or airplane.

The system may further comprise guide members extending preferably in parallel to the row of rollers for receiving and guiding an edge portion of a ULD being arranged on the row of rollers. These guide members may be configured according to known configurations (so-called YZ-guides or YZ-rails) and may, e.g., receive and/or engage with a lower rim portion of a ULD so as to avoid a movement transversal to the row of rollers.

Furthermore, at least one guide rail is provided in the cargo hold floor and extends substantially in parallel to the at least one row of rollers. In this context, the row of rollers and guide rail may generally describe any straight or curved course, whereas in the case of using the system in an aircraft, a straight course may be particularly efficient. According to one example, the guide rail is arranged between and, optionally, confined by two adjacent (and preferably parallel) rows of rollers. Accordingly, the guide rail may be arranged between two sidewall portions of the rows of rollers, thus being defined and/or enclosed thereby. In other words, the guide rail may generally comprise two opposite sidewall portions which may be directly formed by the adjacent rows of rollers and in particular by the track or frame members thereof.

The guide rail may comprise a floor area, which may comprise a substantially planar floor surface and which may extend substantially in parallel to a surface of the cargo hold floor and/or to a movement plane of the loads as defined by the at least one row of rollers. The floor area may define a movement plane for a transport vehicle as discussed below. Moreover, the guide rail may comprise sidewall portions which may run substantially in parallel to one another and/or may be arranged at an angle to the floor area of, for example, ca. 90°. The sidewall portions may also run substantially in parallel to a movement axis of the transport vehicle and, as previously discussed, may be formed by adjacent rows of rollers.

The guide rail may comprise similar materials as the cargo hold floor. In particular, it may comprise materials which allow for a low-loss and especially low-friction movement of the transport vehicle, such as metallic, plastic or composite materials.

The system for moving loads further comprises at least one transport vehicle which is removably received in the guide rail and movable along the guide rail. The term "removably" may relate to a possibility of an easy removing or detaching of the transport vehicle from the guide rail. In particular, it may relate to removing the transport vehicle without having to carry out disassembly operations at the transport vehicle and/or the guide rail (i.e., the transport vehicle being removable without disassembly). For example, the transport vehicle may be removable by means of a simple automatic or manual adjustment of connecting elements to the guide rail, such as guide rollers or wheels, without having to disassemble such elements from the transport vehicle as such. Overall, the transport vehicle may thus be selectively arranged in the guide rail with limited efforts for carrying out a loading and/or unloading operation of the cargo hold. For purposes of maintenance and/or in case the loading/unloading operations are completed, the transport vehicle may then again be removed from the guide rail.

The transport vehicle generally enables an efficient movement of loads, so that a loading and unloading of the cargo hold is possible. Similarly, the transport vehicle may partially or completely replace driven rollers (PDUs) which have so far been used for moving the loads. This may help to reduce costs and weight. Instead, the transport vehicle can be selectively arranged in the guide rail as soon as the need arises. After completing a loading/unloading operation, it can again be removed therefrom, so that the weight of the complete system (e.g., during a flight) is not unnecessarily increased. Yet, it is equally contemplated to maintain the transport vehicle substantially permanently in the guide rail. This allows for immediately commencing unloading operations, e.g., after an aircraft has landed. Even in case of such permanently on-board included transport vehicles, significant weight advantages can be achieved compared to distributing large numbers of single PDUs throughout the cargo hold.

In this context, the guide rail enables a standardized, fast and reliable movement of the transport vehicle along a preferred movement axis. Furthermore, the guide rail provides a free space in which the transport vehicle can be arranged and move, so that the transport vehicle can be designed with a certain maximum height while still being able to pass below a load being arranged on the at least one row of rollers. This increases the degrees of freedom when designing the transport vehicle, which can thus be optimized with regard to weight, technical functionality and costs.

The transport vehicle further comprises at least one coupling arrangement which is adapted to selectively couple the transport vehicle with a load deposited onto the at least one row of rollers, so that the load is movable in accordance with a movement of the transport vehicle. For doing so, the coupling arrangement may comprise at least one coupling element which is movable between a first position, in which the transport vehicle can be arranged below a load that is positioned on the at least one row of rollers, and a second position, in which the coupling element interacts with the load so that it can be jointly moved with the transport vehicle. In other words, the transport vehicle may push and/or pull the load along the row of rollers through the cargo hold if being coupled thereto by arranging the coupling element in the second position. More specifically, in the second position the coupling element may project from the transport vehicle beyond a movement plane of the load as defined by the rollers (i.e., a virtual plane as defined by a surface of the rollers which may be equivalent to a plane in which the load contacts the row of rollers) in order to interact with a load being positioned on the rollers. For example, the coupling element may directly or indirectly contact the load, so that a movement of the transport vehicle along the guide rail is transmitted onto the load. Accordingly, the load can be jointly moved with the transport vehicle along the guide rail and in parallel to a surface of the cargo hold floor.

In its first position, on the other hand, the coupling element may be arranged so as to not substantially project from the transport vehicle and/or guide rail. For example, it may be positioned at a distance to a movement plane of the load as defined by the rollers and/or to a plane in which the load contacts the row of rollers. This way, the transport vehicle may move along the guide rail and pass below loads being positioned on the at least one row of rollers without contacting and moving the loads.

In one example, in the second position, at least a first portion of the coupling element extends from the transport vehicle towards the load, in order to produce a connection between the load and the transport vehicle. This may include producing a (direct or indirect) form fit between the load and the transport vehicle. Also, this may include an interaction between the first portion and a sidewall portion of the load, the sidewall portion extending at an angle to a bottom surface or underside of the load which faces the cargo hold floor. The sidewall portion may also include a lower rim portion of the load (e.g., in the form of a transitional portion between the sidewall and bottom surface). The first portion of the coupling element may further be configured as a plate-type member to provide a sufficient contact surface to the load. The coupling element may further comprise a second portion which extends at an angle (and preferably substantially orthogonally) to the first portion. This may enable substantially grasping or gripping around a lower rim portion of the load by way of the coupling element.

The coupling element may further be configured as a platform or contact plate, which in its second position is configured to rest against (and/or contact) the load, and preferably a bottom surface of underside of the load. This way, friction forces may be produced in order to transmit a movement force of the transport vehicle onto the load. This is advantageous in that one transport vehicle can be connected to a plurality of different types of loads, without having to specifically adapt the load and/or transport vehicle, e.g., in the sense of providing standardized coupling interfaces thereat. Note that the transport vehicle (e.g., by way of a coupling element in the form of a contact plate) may also be configured to at least temporarily lift the load off and above the row of rollers and move it along the cargo hold floor at least for a limited distance without substantial additional structural support. This way, less rollers can be used which may instead be replaced by dedicated support points.

Accordingly, the coupling element may generally provide a coupling or locking engagement between the transport vehicle and load, so as to avoid a relative movement there between, e.g., along a movement axis of the transport vehicle and/or along a longitudinal axis of at least one of the guide rail, the row of rollers, the cargo hold and airplane. As previously discussed, the coupling element may instead enable a joint movement along the axes if being activated for providing the engagement.

The transport vehicle may further comprise a drive unit for moving the transport vehicle along the guide rail. The drive unit may comprise an electric motor which may be powered by means of a battery pack included in the transport vehicle and/or a contactless power loop, which may be arranged in the cargo hold floor or a floor area of the guide rail. The drive unit may further comprise at least one driven roller, driven wheel, driven ball, driven chain or driven belt, which may each abut against an adjacent portion of the guide rail, such as a sidewall portion or floor area thereof. Note that the term roller may include spherical, disc-shaped and/or thin-walled wheels or balls. Also, the drive unit may comprise a driven gear, sprocket or the like and the guide rail may comprise a portion having a corresponding engagement profile, such as a toothed rack mounted to its floor area and facing the transport vehicle.

Moreover, for guiding the transport vehicle along the guide rail, a rail member may be provided extending along the guide rail and, preferably, in parallel to the at least one row of rollers. The transport vehicle may further comprise a receiving portion, e.g., in the form of a recess, opening or the like, so that the rail member may be received therein. The receiving portion may further be designed in a tunnel-like manner and generally allow for a movement of the transport vehicle along the rail member. Moreover, a drive unit of the transport vehicle may comprise driven members (e.g., rollers, wheels, balls, chains or belts) which rest against and/or directly contact the rail member. Preferably, these drive members are biased against the rail member, for example, by way of spring members. This way, a movement force may be produced to push the transport vehicle along the rail member and thus along the guide rail.

The transport vehicle may further comprise at least one transport unit on a surface facing a load which is arranged on the at least one row of rollers. The transport unit may include one or more non-actively driven ball units or rollers, which may comprise so-called omnidirectional rollers. The transport unit may generally allow for moving the load relative to the transport vehicle (e.g., sliding along and/or transverse thereto), in particular in case the coupling arrangement assumes a non-actuated state without engaging with the load. Note that the rollers or ball units may also be actively driven, e.g., by means of electric drive units. A respective transport unit may generally be useful if arranging the transport vehicle close to a cargo door area and the load first having to be moved in a direction transversal to the at least one row of rollers and/or the guide rail and, e.g., even across the transport vehicle.

The system further comprises at least one locking arrangement which is adapted to, in an active state, lock the load relative to the cargo hold floor (and/or the row of rollers) and in a non-active state allow a relative movement between the load and the cargo hold floor (and/or the row of rollers). For doing so, the locking arrangement may selectively engage (indirectly or directly) with the load, to lock its position, e.g., relative to the row of rollers. The locking arrangement may be integrated into or be arranged close or adjacent to the row of rollers. In one example, the row of rollers comprises an inner sidewall portion which, as previously discussed, may also define a sidewall portion of the guide rail. In addition, the row of rollers may comprise an outer sidewall portion which may substantially face away from the guide rail. In this context, the locking arrangement may be arranged adjacent to or at the outer sidewall portion. Also, when viewed along a longitudinal axis of the at least one row of rollers, the locking arrangement may be arranged in between two subsequent rollers.

The locking arrangement may generally be configured as a separate module or unit which can be arranged within the system and, in particular, within the cargo hold floor or at the at least one row of rollers. For doing so, it may comprise a locking element as discussed below and/or an at least partially closed housing for accommodating at least some of the components of the locking arrangement. Also, the locking arrangement may comprise suitable connecting portions and/or elements for connecting to the cargo hold floor and/or at least one row of rollers.

The locking effect provided by the locking arrangement may at least include a locking in a movement direction of the loads relative to the row of rollers and/or in parallel to a surface of the cargo hold floor. For example, the locking may include preventing a relative movement along the movement axis of the transport vehicle and/or along a longitudinal axis of at least one of the guide rail, the row of rollers, the cargo hold and airplane. Instead, the locking arrangement may exert a force onto and/or define a form fit with the load, so as to hold the load in a predetermined position within the cargo hold and, in particular, along any of the above discussed axes.

In the system for moving loads according to the invention, the transport vehicle is further adapted to operate the locking arrangement according to at least one of the following:

operating the locking arrangement, so that it assumes the active state; and     operating the locking arrangement, so that it assumes the non-active state.

In other words, locking and/or unlocking of the load within the cargo hold may be initiated by means of the transport vehicle which may, e.g., directly actuate the locking arrangement for assuming the desired active or non-active state. This may be provided as an alternative or in addition to individual motor units of known locking arrangements for producing the state-changes. Yet, in one example, the locking arrangement is free of additional motor units for producing the desired state-changes, and is instead solely operable by means of the transport vehicle (e.g., by way of actuators of the transport vehicle as discussed below).

A possible advantage of this solution is that the transport vehicle may move a load along the at least one row of rollers to a desired position to then directly operate the locking arrangement, so as to secure the position of the load. Similarly, during unloading of the cargo hold, the transport vehicle may move under a load being arranged on the row of rollers to then directly operate the locking arrangement for unlocking the load. Following that, the coupling arrangement of the transport vehicle may be actuated to produce the above discussed connection between the transport vehicle and load for moving the latter along the row of rollers and, e.g., towards a cargo door of an airplane. Another possible advantage is that in flight, only mechanical locking may be active. No electrical failure can thus lead to the release of the locking arrangement acting as a latch/ULD restraint (no electrically powered actuator at locking position). This may provide better reliability of the locking function as the restraint system remains simple. Moreover, the transport vehicle may generally act as a robotic unit to replace human work, especially in narrow cargo holds.

Note that this can be carried out highly automatically if, for example, providing a controller of the transport vehicle with information regarding the required load-movements and/or associated locking/unlocking operations in advance or online Such a controller may be vehicle-integrated and/or communicate with an external controller by wireless communication. In other words, an operator may only provide information regarding an area where a specific load is to be transported and locked (or unlocked and transported away from), whereas the required operations may then be carried out substantially independently of any further manual input by means of the transport vehicle.

Operating the locking arrangement for assuming the respective states may generally include any action being carried out or at least initiated by the transport vehicle, as well as any dedicated signals or information being provided by the transport vehicle in this regard. In one example, the transport vehicle at least indirectly exerts a force, e.g., onto a dedicated operating portion of the locking arrangement to bring about the desired state-changes.

The transport vehicle may comprise at least one actuator for operating the locking arrangement. In general, the actuator may comprise an actuating element, such as a gripper, contact structure or mechanical element (e.g., a rod, arm, pin or plate). Furthermore, the actuator may comprise a drive unit for initiating a predetermined movement of at least a portion of the actuator (e.g., of its actuating element). The drive unit may comprise an electric, pneumatic or hydraulic drive. In general, the actuator may further be adapted to operate the locking arrangement in a mechanical manner. This may include the actuator directly or indirectly exerting a force onto the locking arrangement, e.g., by resting against or contacting a dedicated operating portion thereof.

The locking arrangement may further comprise a locking element which is configured to, in the non-active state of the locking arrangement, assume a first position in which it does not interact with the load in a locking manner, and in the active state of the locking arrangement assume a second position in which it interacts with the load in a locking manner. The locking element may be provided in the form of a latch element. Also, the locking element may generally be movable between the first and second position, in particular about and/or along a predefined movement axis. This may include the locking element being generally retractable and/or pivotable to change between these positions.

In general, when assuming the second (locking) position, the locking element may be configured to project or extend from the locking arrangement in a desired manner, e.g., to engage with the load. On the other hand, in the first (non-locking) position, locking element may be arranged so as to be retracted from the load, so that the latter may freely move along the row of rollers. In its second (locking) position, the locking element may further project relative to the row of rollers and extend into a movement/contact plane of the load as defined by the rollers. Similarly, when assuming the first (non-locking) position, the locking element may be arranged so as to not project into the plane and/or be generally be arranged below the plane and close to the cargo hold floor.

The locking arrangement may further comprise a fixing element which is configured to at least temporarily fix the locking element in the first position. The fixing element may be provided in the form of a clamp, pin, undercut or the like and may generally be configured to exert a force onto and/or engage with a dedicated portion of the locking arrangement or locking element for securing it in the first position. Note that the fixing element, in particular if being provided as a pin, may also extend through a housing of the locking arrangement and/or further members of the system as discussed below. Additionally or alternatively, the fixing element may engage with a preferably stationary portion in the surrounding, such as a dedicated portion of the row of rollers or guide rails (e.g., a respective sidewall portion thereof). In other words, the fixing element may provide a mechanical connection between the locking element and a stationary part of the locking arrangement or its surroundings, so as to secure the locking element in its first position. In general, the fixing element may releasably fix the locking element in its first position and, in particular, allow for a frequent selective fixing and releasing of the locking element.

In one example, the fixing element is provided in the form of a locking pin to selectively engage with the locking arrangement and/or its surroundings. Specifically, the locking pin may engage with and thus selectively fix the locking element and/or a movable member connected thereto, such as a rotational axis or shaft member thereof. In this context, the fixing element may be connected or fixed to a stationary portion of the locking arrangement or surroundings.

The locking pin may also be directly connected to the locking element and/or a movable member connected thereto, e.g., for being jointly moved therewith between the first and second position. In this context, the locking pin may be configured to selectively engage with a dedicated stationary engagement structure. The engagement structure may be provided in the surroundings and in particular within a sidewall portion of the row of rollers. Also, it may generally comprise a recess, opening, through-hole or the like. Furthermore, the locking pin may be biased towards the engagement structure, for example, by means of a spring element, so as to automatically engage therewith if being moved close thereto (e.g., by means of a snap-fit engagement). Overall, if moving the locking element from the second position back to the first position for unlocking a load, the fixing element may automatically engage with a suitable stationary engagement structure so as to hold the locking element in its first position.

According to a further embodiment, the locking element is biased into the second position. This may be achieved by a spring element, e.g., in the form of a torsion spring, which may be arranged around a movement axis or shaft of the locking arrangement and/or locking element. If further providing a fixing element as discussed above, this may enable automatically moving the locking element into its second (locking) position when the fixing element is operated so as to release the locking element from its first (non-locking) position.

The actuator of the transport vehicle may further be configured to operate the fixing element according to at least one of: operating the fixing element, so that it fixes the locking element in the first position; and operating the fixing element, so that it releases the locking element from the first position.

Again, this may include contacting and/or exerting a force onto the fixing element, e.g., for disengaging it with an engagement structure as discussed above. In one example, the actuator is configured to exert a force onto the fixing element, so as to force it out of the engagement structure, thereby releasing the locking element. In case of biasing the locking element into its second position as previously discussed, the locking element may then be automatically moved into the second position. To put it differently, by operating the fixing element the actuator may initiate a movement of the locking element whereby it snaps back into its second position. Similarly, the actuator may operate the fixing element so as to fix the locking element in the first position, for example, by initiating, promoting or producing an engagement of the fixing element with a suitable engagement structure.

The fixing element may be arranged at a common height level with a sidewall portion of the guide rail relative to (and/or above) the cargo hold floor. That is, when viewed along a height axis extending from the cargo hold floor and, in particular, extending orthogonally therefrom, the fixing element and sidewall portion may extend along at least one common height level with respect to the axis. This way, a compact design of the overall system can be achieved. In addition, the fixing element may be provided adjacent to and/or opposite to and/or even in contact with the sidewall portion.

Moreover, the fixing element may be arranged at least partially opposite to an opening in the sidewall portion of the guide rail. The opening may be provided in the form of a through-hole and may generally act as an engagement structure as discussed above for engaging with the fixing element to secure the locking element in its first position. Specifically, the fixing element may extend at least partially into the opening for producing the desired engagement. This may be promoted by the above-discussed snap-in effect when biasing the fixing element, e.g., by means of a spring.

On the other hand, the opening may define an access portion to the fixing element, in particular in a state of the fixing element being of fixing the locking element in its first position. Specifically, the opening may allow an actuator of the transport vehicle to extend therethrough and exert a force on and/or contact the fixing element to disengage it from the engagement structure. In one example, the fixing element may be provided in the form of a pin which engages with the opening and at least partially extends therethrough, whereas the actuator may comprise an unlocking pin which is configured to be inserted into the opening from an opposite side of the sidewall portion. Following that, the unlocking pin may push the fixing element out of the opening to disengage it therefrom.

Again, the sidewall portion of the guide rail may be formed by or at least include a respective sidewall portion of the row of rollers, whereas the fixing element and transport vehicle may be arranged on opposite sides of the sidewall portions and may be configured to (preferably mechanically) interact with one another through the opening.

According to a further embodiment, the actuator is configured to move the locking element from the second into the first position. This may include moving the locking element from a projecting second position discussed above back to a non-locking retracted first position, e.g., by directly or indirectly exerting a force thereon.

In this context, the actuator may further be configured to rest against the locking element and/or contact the locking element. For doing so, the actuator or at least an actuator element thereof, such as an arm, rod or the like, may be movable relative to the transport vehicle and/or guide rail towards the locking element. This may include moving the actuator (or actuator element), so as to extend above and/or across the at least one row of rollers or, in other words, bridge the row of rollers. Note that the actuator may further comprise a friction-force reducing element at a portion configured to contact the locking element, such as a sliding surface or rotatable contacting roller.

Moreover, the actuator may be configured to rotate about a rotational axis while moving the locking element from the second into the first position (or, to put it differently, operate the locking element by way of a pivoting motion). The rotational axis may be provided eccentrically from a geometric center and/or center of gravity of the actuator or at least of an actuator element thereof. For example, the actuator (or actuator element) may be connected to the transport vehicle means of a driven rotational joint, thus being movable towards the locking element by way of a respective rotational movement. In this context, one end of the actuator may be connected to the rotational joint, whereas the other end may be provided for resting against and/or contacting the locking element. Note that this may also include moving the locking element back into its first position by means of operating only one actuator drive unit, such as the previously discussed driven rotational joint.

The system may further comprise a detection unit which enables inferring on at least one of a successful locking of the load and a successful unlocking of the load. The detection unit may at least partially be integrated into the transport vehicle. The detection unit may comprise suitable detecting or sensing devices for acquiring and/or generating signals, data and/or information which allow for inferring on the successful locking or unlocking. In one example, the detection unit is fully integrated into the transport vehicle and communicates preferably in a wireless manner with an information receiving unit, e.g., in the form of a display device, computer, tablet, smartphone or the like for displaying the detection results to an operator. Also, a respective information receiving unit may be integrated into existing information and/or display devices of the cargo hold, such as a cabin or cockpit integrated information system of an airplane (e.g., a cabin or cargo hold management system CMS). Note that the information provided by the detection unit may generally be used for generating acoustic, haptic and/or optical signals to an operator in case a successful locking and/or unlocking of the load has been determined.

The detection unit may comprise at least one optical detection unit, such as a camera sensor or the like, which may be mounted to the transport vehicle. The optical detection unit may provide information based on or including image data captured by the detection unit, for example, image data of the locking arrangement. The transport vehicle may comprise a processor or computing unit for further transferring the image data acquired by the optical detection unit directly to an information receiving unit as previously discussed. Alternatively or in addition thereto, the processor may further interpret or process the image data, e.g., to infer on a successful locking and/or unlocking of the load, wherein the result of the determination may then be directly signaled to an operator and/or transmitted to suitable information receiving units as discussed above. Note that with the at least one optical detection unit, it is also possible to detect obstacles in the surrounding of the transport vehicle and, optionally, control a movement of the vehicle in response thereto.

According to a further aspect, the transport vehicle comprises a first actuator for operating the locking arrangement so that it assumes the active state, and a second actuator for operating the locking arrangement so that it assumes the non-active state. In other words, the transport vehicle may comprise individual actuators for carrying out the respective operations of the locking arrangement. This separation of functions may allow for an optimized design of the actuators with regard to the specific operations which they are supposed to carry out.

The invention further relates to a locking arrangement for a system according to any of the above aspects. Likewise, the invention relates to a transport vehicle for a system according to any of the above aspects. Note that this may include configuring the locking arrangement or transport vehicle according to any of the above examples or to provide any of the above operating states and/or effects.

With regard to the locking arrangement, this may relate to the locking arrangement comprising a respective locking element, fixing element or spring element as previously discussed. Specifically, the locking arrangement may be configured to provide the active or non-active state by comprising a locking element according to any of the previous aspects. Moreover, the locking arrangement may comprise a fixing element for selectively fixing the locking element in its first position. Again, the fixing element may be configured according to the above examples and, e.g., be biased by a spring element and/or arranged so as to be able to engage with an adjacent engagement structure.

Similarly, the transport vehicle may comprise a coupling arrangement as previously discussed as well as any of the above actuator-related aspects. Moreover, the transport vehicle may comprise a drive unit according to the above examples for moving along the guide rail. In one example, the transport vehicle thus comprises a coupling arrangement, drive unit and at least one actuator for operating the locking arrangement according to at least one of the following: operating the locking arrangement, so that it assumes the active state; and operating the locking arrangement, so that it assumes the non-active state.

As a further aspect, the at least one row of rollers may include a roller unit which is supported and/or contacted by a track or frame member of the row of rollers only in one region (or only on one side). The roller unit may comprise at least two rotating members (e.g., outer rings or races of a ball bearing unit) which may rotate about a central unit (e.g., in the form of a shaft or bolt member). The central unit may be supported by the row of rollers only in one region, e.g., by being received in a through-hole within the track member of the row of rollers. Moreover, the central unit may comprise two end portions, with at least one rotating member being arranged at each end portion. In this context, the central unit may further comprise a support region in which it is supported by the row of rollers, the support region being arranged between the end portions and, preferably, substantially in a middle part of the central unit with respect to both end portions (i.e., the point of support or contact at the central unit being spaced apart from both end portions by equal distances).

The invention further relates to a method of operating a system for moving loads, in particular within an aircraft, the system comprising: a cargo hold floor, at least one row of rollers including a plurality of rollers which are integrated into the cargo hold floor one behind another, at least one guide rail provided in the cargo hold floor and extending substantially in parallel to the at least one row of rollers, and at least one transport vehicle which is removably received in the guide rail and movable along the guide rail and which comprises at least one coupling arrangement which is adapted to selectively couple the transport vehicle with a load arranged on the at least one row of rollers, so that the load is movable in accordance with a movement of the transport vehicle, at least one locking arrangement which is adapted to, in an active state, lock the load relative to the cargo hold floor (and/or the row of rollers) and in a non-active state allow a relative movement between the load and the cargo hold floor (and/or the row of rollers), and wherein the method comprises at least one of the following steps: operating the locking arrangement by way of the transport vehicle, so that it assumes the active state; and operating the locking arrangement by way of the transport vehicle, so that it assumes the non-active state.

Note that the method may comprise any further steps for achieving any of the effects and/or operating states of the system discussed above. For example, the method may further comprise steps of moving and/or actuating respective actuators of the transport vehicle as well as steps relating to moving a locking element of the locking arrangement between its first and second position. Similarly, a step of acquiring information which allow for inferring on a successful locking and/or unlocking of the load, e.g., by means of the above discussed detection unit, may be included.

BRIEF DESCRIPTION OF THE DRAWINGS

In the following, preferred embodiments of the invention will be discussed based on the attached drawings, wherein.

DETAILED DESCRIPTION OF THE PREFERRED EMBODIMENTS

In the following, a system according to a first embodiment of the present invention will be described with reference to FIGS. 1-6. As these figures are merely schematic, the respective illustrations may deviate from one another with regard to certain details.

Figure 1:
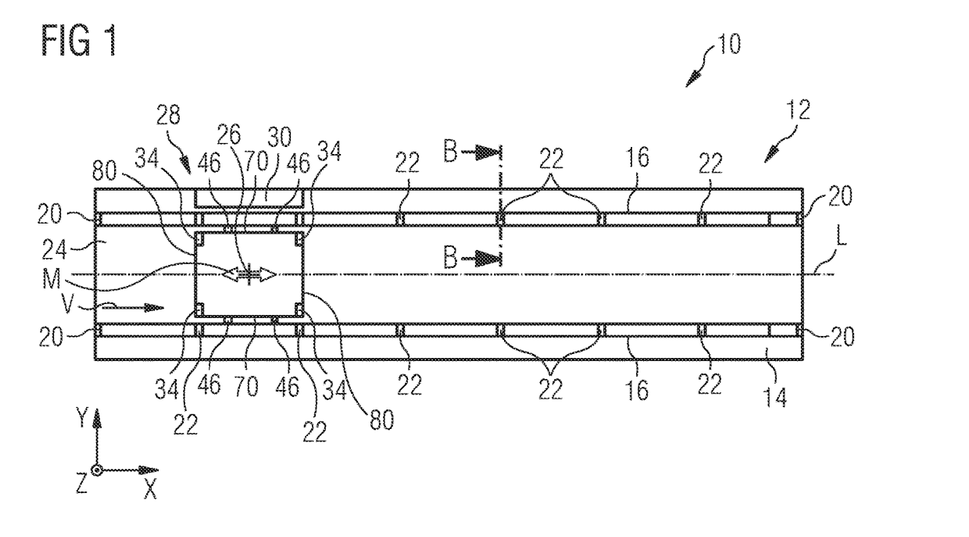
FIG. 1 shows a schematic view of a cargo hold comprising a system according to the present invention.

In FIG. 1, a cargo hold 10 of an airplane is shown, comprising a system 12 for moving loads according to a first embodiment of the present invention. The system 12 comprises a cargo hold floor 14 extending substantially along a longitudinal axis L of the cargo hold 10, the axis L also coinciding with the general longitudinal axis of the airplane (i.e., extending along a flight direction thereof).

The system 12 further comprises two rows of rollers 16 being arranged in parallel to one another and both extending along the longitudinal axis L. The rows of rollers 16 each comprise a plurality of cylindrical rollers 18 which are not specifically illustrated in FIG. 1. The rollers 18 each rotate about individual rotational axes extending substantially orthogonally to the longitudinal axis L as well as in parallel to a surface of the cargo hold floor 14. Such arrangements are generally known.

The surfaces of the rollers 18 hence define a common (virtual) plane P extending in parallel to the cargo hold floor 14, the plane P corresponding to a contact plane of the rollers 18 and a load being positioned on the rows of rollers 16. Also, the plane P corresponds to a movement plane of the load relative to and along the cargo hold floor 14. The rows of rollers 16 thus allow for pushing and/or pulling a load such as a standardized ULD along the longitudinal axis L by moving it in parallel to the cargo hold floor 14.

In their respective end portions along the longitudinal axis L, the rows of rollers 16 each comprise end stop members 20 which limit a further movement of a load along the rows of rollers 16.

The rows of rollers 16 further each comprise a plurality of locking arrangements 22 being arranged in regular intervals along the longitudinal axis L. The locking arrangements 22 are each enclosed by two subsequent rollers 18 of the respective rows of rollers 16 when viewed along the longitudinal axis L. Furthermore, the locking arrangements 22 of the individual rows of rollers 16 are arranged in similar positions along the longitudinal axis L, i.e., two locking arrangements 22 being always substantially arranged oppositely to one another.

As further detailed below, the locking arrangements 22 generally block a relative movement between the loads and the rows of rollers 16, in particular along the longitudinal axis L. Note that the longitudinal axis L may generally coincide with an X-axis of the airplane according to a standard airplane coordinate system as indicated in FIG. 1. Accordingly, the locking arrangements 22 may also be referred to as X-locks or X-latches.

Furthermore, in FIG. 1 the locking arrangements 22 are schematically depicted as being directly integrated into the rows of rollers 16. Yet, as evident from the following discussions, at least in the context of the present embodiment, the locking arrangements 22 are actually arranged at an outer sidewall portion of the respective rows of rollers 16.

As further shown in FIG. 1, the rows of rollers 16 enclose a guide rail 24 extending between the rows of rollers 16 and along the longitudinal axis L. The guide rail 24 defines a free space within or on the cargo hold floor 14 for removably receiving a transport vehicle 26. As indicated by arrow M, the transport vehicle 26 may move within the guide rail 24 along the longitudinal axis L for pushing and/or pulling cargo goods to be transported, such as ULDs, along the rows of rollers 16. The arrow M thus defines a movement axis of the transport vehicle 26.

Still further, the cargo hold 10 comprises a cargo door area 28 having a door sill 30. Through the cargo door area 28, cargo goods may be moved in a generally known manner into the cargo hold 10. This may include a movement along the Y-axis indicated in FIG. 1 and thus transverse to the longitudinal axis L. For enabling this movement, the cargo hold floor 14, the rows of rollers 16 and/or the transport vehicle 26 may comprise suitable transport units 94, such as omnidirectional rollers or ball mats or the like. Such transport units 94 of the transport vehicle 26 will be further discussed with reference to FIG. 7 below.

Figure 2:
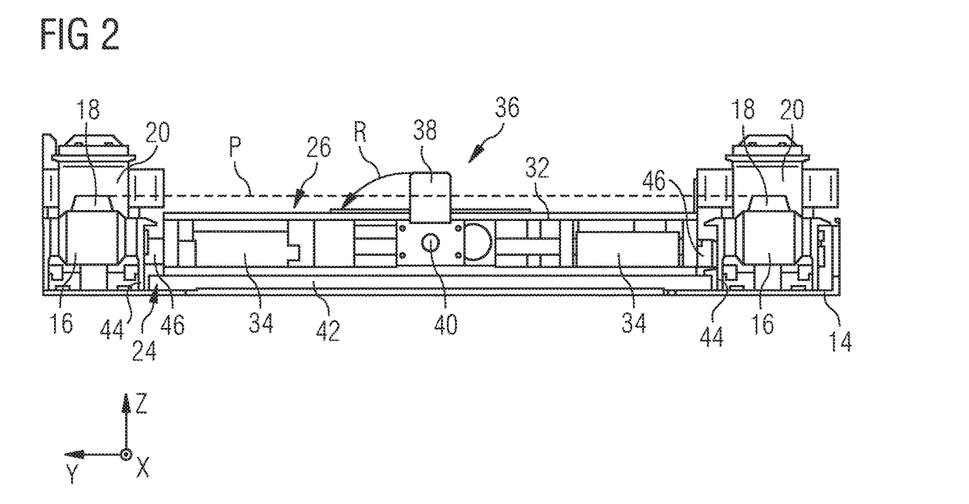
FIG. 2 shows a front view of a transport vehicle arranged in a guide rail of the system according to FIG. 1.

FIG. 2 shows a schematic front view of the transport vehicle 26 along arrow V of FIG. 1. Again, one can see the rows of rollers 16, which enclose the guideway 24 and the transport vehicle 26 received therein. Furthermore, one can now more clearly see individual rollers 18 within the rows of rollers 16. On the other hand, the locking arrangements 22 are not specifically shown in this figure. Also, FIG. 2 does not include the arm actuator 74 as discussed below with reference to FIGS. 4 and 5.

From FIG. 2, it can be gathered that the transport vehicle 26 comprises a substantially rectangular frame 32 which accommodates numerous units and components of the transport vehicle 26. For example, the transport vehicle 26 comprises driven rollers 34 in its edge portions as likewise indicated in FIG. 1. The driven rollers 34 form part of a drive unit of the transport vehicle 26 which further comprises a non-illustrated electric motor being powered by a vehicle-integrated battery pack.

Furthermore, a coupling arrangement 36 is shown, comprising a plate-type coupling element 38. In FIG. 2, the coupling element 38 is shown in an (active) second position, in which it extends beyond the movement/contact plane P defined by an outer surface of the guide rollers 18. This way, the coupling element 38 may contact a load being positioned on guide rollers 18, thereby transmitting a movement of the transport vehicle 26 onto the load to move it along the rows of rollers 16 and in parallel to a surface of the cargo hold floor 14.

On the other hand, the coupling element 38 may be moved into a non-upright and inactive first position, in which it extends below the movement/contact plane P and is substantially arranged within the frame 32 of the transport vehicle 26. This movement into the first position (and back into the second position) takes place by means of a pivoting motion according to arrow R of FIG. 2 about a rotational joint 40 and is generally electrically driven. Accordingly, in the first position, the transport vehicle 28 may pass below a load being arranged on the rows of rollers 16 in a collision- and contact-free manner.

Still further, FIG. 2 shows that the guide rail 24 comprises a floor area 42 extending in parallel to the cargo hold floor 14, as well as two opposite sidewall portions 44, each being defined by a respective sidewall portion of one of the rows of rollers 16. Note that the transport vehicle 28 comprises a plurality of passive guide rollers 46 (two on each side) in opposite edge regions of the transport vehicle 26, the edge regions extending along the movement axis M (cf. FIG. 1). These passive guide rollers 46 self-center the transport vehicle 26 when moving along the guide rail 24. Note that it is equally conceivable to use the guide rollers 46 as actual driven rollers and instead configure the rollers 34 at the underside of the transport vehicle 26 as passive rollers for guiding and supporting the transport vehicle 26 on the floor area 42.

For the sake of completeness, it is noted that FIG. 2 also shows two of the end stop members 20 which correspond to the right end stop members 20 as shown in FIG. 1.

Figure 3:
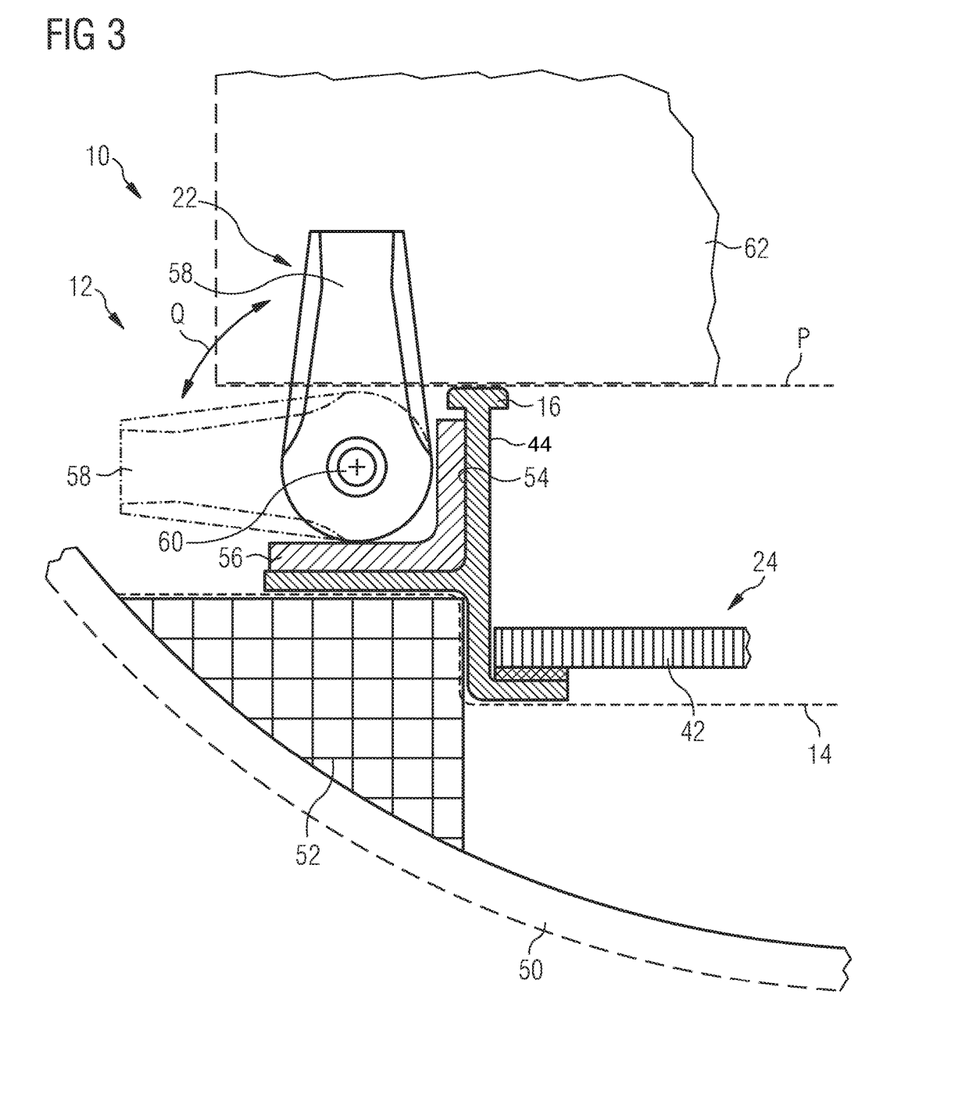
FIG. 3 shows a schematic view for explaining the position and operation of a locking arrangement of the system according to FIG. 1.

FIG. 3 is a schematic view for illustrating the system of FIG. 1 in further detail, in particular with regard to the locking arrangement 22. More precisely, FIG. 3 corresponds to a sectional view along axis B-B of FIG. 1.

Again, one can see that the cargo hold 10 and system 12 comprise a cargo hold floor 14 to which further members of the system 12 are at least indirectly connected. The cargo hold floor 14 which, at least in the context of the present embodiment, is depicted as having a non-planar cross-sectional profile, is further connected to an airframe 50 of the airplane and supported by an airplane support structure 52 of known configuration.

Furthermore, it can be seen that the row of rollers 16 and, in particular, a central track or frame member thereof, is arranged on a corner portion of the cargo hold floor 14 close to the aircraft support structure 52. Note that for illustrative purposes, no rollers 18 of the row of rollers 16 are specifically depicted in FIG. 3. Furthermore, the floor area 42 of the guide rail 24 is shown, which is formed by a plate-type member connected to the row of rollers 16. Again, a sidewall portion 44 of the guide rail 24 is formed by a respective inner sidewall portion of the row of rollers 16, with "inner" referring to facing the guide rail 24, the transport vehicle 26 and/or the opposite row of rollers 16.

On the other hand, at an outer sidewall portion 54 of the row of rollers 16, the outer sidewall portion 54 being arranged opposite to and facing away from the inner sidewall portion 44, a locking arrangement 22 is shown. The locking arrangement 22 comprises a housing member 56 directly abutting and being fixed to the outer sidewall portion 54 of the row of rollers 16. In addition, the locking arrangement 22 comprises a latch-type locking element 58 which rotates about a shaft member 60 defining a rotational axis extending orthogonally to cross-sectional plane of FIG. 3.

Accordingly, the locking element 58 may assume a first position as shown by dashed lines in FIG. 3 in which it extends substantially in parallel to the cargo hold floor 14 and points away from the guide rail 24. As can be gathered from FIG. 3, in this position the locking element 58 does, hence, not significantly protrude beyond the movement/contact plane P as defined by the rows of rollers 16. Accordingly, a load can be moved along the rows of rollers 16 without colliding or interfering with the locking element 58. Note that the position of the movement/contact plane P is only very schematically indicated and is more accurately shown in the view of FIG. 6.

On the other hand, if being rotated about the shaft member 60 along arrow Q of FIG. 3, the locking element 58 will assume a generally upright second position in which it extends substantially orthogonally to the cargo hold floor 14. Also, in the second position the locking element 58 protrudes beyond the movement/contact plane P so that a portion of a load 62 extending laterally beyond the row of rollers 16 can be contacted. A respective portion of the load 62 is schematically indicated in FIG. 3. Accordingly, in this position, a relative movement between the load 62 and the rows of rollers 16 is blocked, in particular when simultaneously activating numerous locking arrangements 22 and/or in case the locking element 58 directly engages the load (e.g., engages with a recess, through-hole or the like).

Therefore, in case the locking element 58 assumes its first (non-locking) position, the locking arrangement 22 can generally be referred to as being in an inactive state. To the contrary, in case the locking element 58 assumes its second (locking) position, the locking arrangement can generally be referred to as being in an active state.

Figure 4:
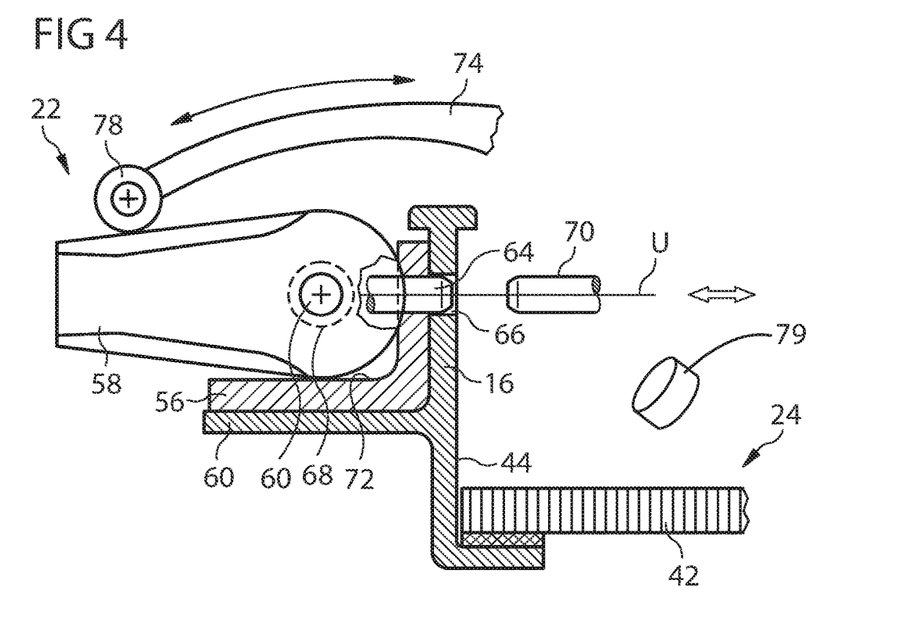
FIG. 4 shows a schematic view for explaining the design and function of the actuators of the transport vehicle according to FIG. 1.

With reference to FIG. 4, ways of operating the locking arrangement 22 by means of the transport vehicle 24 will be further discussed. FIG. 4 depicts a detailed view of the locking arrangement 22 as shown in FIG. 3, while adding further details which are not included in FIG. 3. More precisely, the locking element 58 is depicted in its first non-locking position. Yet, FIG. 4 shows that the locking element 58 is actually held in this position by means of a fixing element 64. The fixing element 64 takes the form of a locking pin extending into an opening (through-hole) 66 which extends through both of the housing 56 of the locking arrangement 22 and a sidewall portion of the row of rollers 16.

The locking pin 64 is biased away from the shaft member 60 and into the opening 66 by means of an only schematically illustrated spring member 68 of the locking arrangement 22. In the depicted state, locking pin 64 can thus be moved along an axis U defined by the through-hole 66 to and away from the shaft member 60. In sum, the through-hole 66 hence defines an engagement structure in a stationary part of the system 12 with which the fixing member 64 in the form of the locking pin can engage to secure the locking element 58 in its first position.

The transport vehicle 26, which is not specifically illustrated in FIG. 3 or 4, comprises an actuator in the form of a translatable unlocking pin 70. The unlocking pin 70 may, similar to the passive guide rollers 46, be provided in preferably both edge regions of the transport vehicle 26 extending along the movement axis M. Note that an approximate position of such unlocking pins 70 is indicated in FIG. 1, whereas the height of the unlocking pins 70 above the floor area 42 is generally chosen to be similar as a height of the locking pin 64 when being received in the opening 66. Moreover, as a general aspect of the invention, the transport vehicle may comprise a plurality of actuators (e.g., at least two or four), such as the unlocking pin 70, thus being configured to substantially simultaneously operate a plurality (e.g., at least two or four) of locking arrangements 22. For example, four unlocking pins 70 may be provided in each edge portion of the transport vehicle 26 of FIG. 1, so as to simultaneously operate respectively adjacent locking arrangements 22.

Thus, if positioning the transport vehicle 26 in the guide rail 24 adjacent to the locking arrangement 22, the unlocking pin 70 of FIG. 4 may be translated along axis U away from the transport vehicle 24 and towards the opposite sidewall portion 44 of the guide rail 24 to enter the through hole 66. This may be achieved by standard electric, hydraulic and/or pneumatic drive units comprised by the transport vehicle 26.

After entering the opening 66, the unlocking pin 70 can directly contact the locking pin 64 of the locking arrangement 22 to exert a pushing force thereon. As soon as the biasing force of the spring member 68 is overcome, the locking pin 64 may thus be pushed further towards the shaft member 60 and into the housing 56 and/or into a recess within the locking element 58. Eventually, this results in the locking pin 64 being pushed out of and disengaging the opening 66, thereby allowing a rotation of the locking element 58 about the shaft member 60.

Accordingly, the actuator 70 of the transport vehicle 24 operates the fixing member 64 so as to release the locking element 58 from its first position. As a result, the locking element 58 may again move to its second position as shown in FIG. 3. This is supported by a spring element 68 in the form of a torsion spring, which biases the locking element 58 into the second position. For doing so, the spring element 68 is arranged about the shaft member 60 in a generally known manner. Note that the torsion spring may also form the spring element 68 for biasing the locking pin 64 so as to extend into the opening 66. Yet, it may also be provided separately therefrom.

Figure 4A:
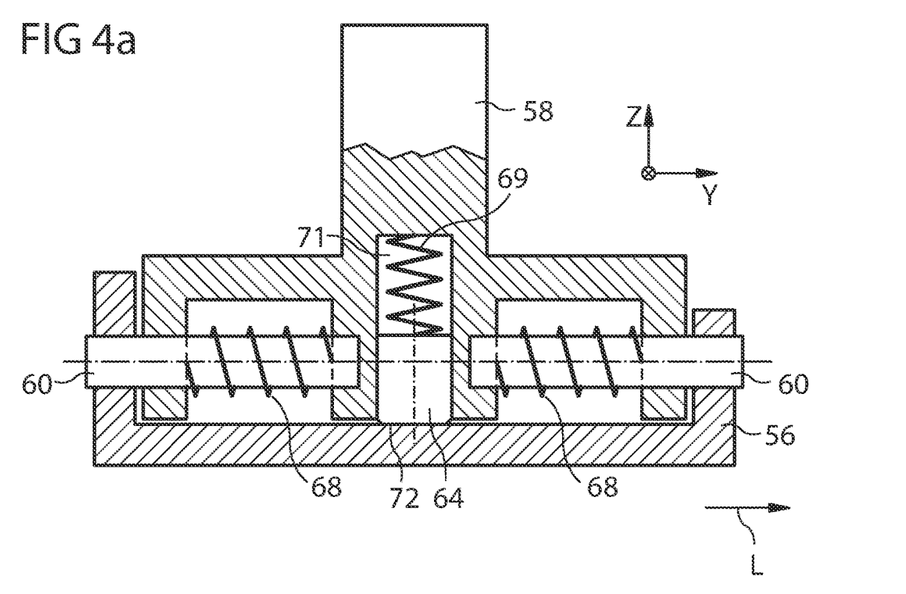
FIG. 4a shows a cross-sectional view of a locking arrangement for being used in the system according to FIG. 1.

This latter alternative with separate spring elements 68, 69 for biasing the locking element 58 and locking pin 64 is shown in the further cross-sectional view of the locking arrangement 22 in FIG. 4a. Again, one can see the locking element 58 being attached to a shaft member 60 (and in this case even two separate shaft members 60) for carrying out the above discussed movements between its different positions. From FIG. 4a, it can also more clearly be gathered how the torsion spring element 68 is arranged about the shaft member 60 to bias the locking element 58 in the above discussed manner. The locking pin 64, on the other hand, is provided with its own spring element 69, wherein the locking pin 64 and the spring element 69 are both received in a recess 71 within the locking element 58. Thus, it becomes evident that when moving the locking element 58 from its first to the second position, the locking pin 64 slides along an inner guide surface 72 of the housing 56 of the locking arrangement 22 against which it is biased by means of the spring element 69. This avoids unwanted damages to the row of rollers 16 and, e.g., by providing suitable material combinations, also between the locking pin 64 and housing 56.

Coming back to FIG. 4, a second actuator in the form of an arm element 74 is shown. The actuator 74 is provided separately from the first actuator 70, which operates the locking element 22 so as to assume its active locking state (i.e., by releasing the fixing element 64 to set off a rotation of the locking element 58 from its first into its second position). Instead, the second actuator 74 is configured to operate the locking arrangement 22 so as to assume its inactive state. This is achieved by exerting a pushing force onto the locking element 58 in its second position. More precisely, the arm element 74 is configured to rotate about a rotational axis extending in parallel to the movement axis M of the transport vehicle 26 and towards the locking element 58.

Figure 5:
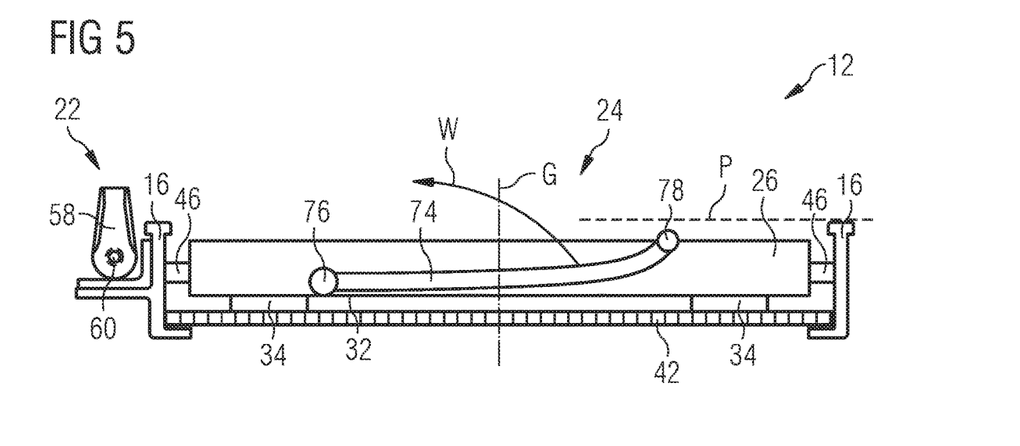
FIG. 5 shows a further schematic view for explaining the position and operation of an arm-type actuator of the transport vehicle according to FIG. 1.

This is indicated in the schematic view of FIG. 5 which corresponds to the view of FIG. 2. Also, the cross-section plane generally extends orthogonally to the longitudinal axis L and movement axis of FIG. 1.

In FIG. 5, the transport vehicle 26 is again depicted as being accommodated within the guide rail 24 and arranged between the parallel rows of rollers 16. Moreover, the passive rollers 46 for self-centering the transport vehicle 26 between the rows of rollers 16 as well as the driven rollers 34 can again be seen. Furthermore, the arm element 74 is shown which is connected to a preferably electrically driven rotational joint 76. Note that the driven rotational joint 76 is arranged remote or eccentric from a middle plane G of the transport vehicle 26, the middle plane G comprising the movement axis M of FIG. 1. Also, the driven rotational joint 76 is positioned closer to the row of rollers 16 at which the locking arrangement 22 to be to be operated is arranged. As previously indicated, is it is also conceivable to actively drive the self-centering rollers 46 and render the rollers 34 at the underside of the transport vehicle 26 passive.

Note that FIG. 5 generally shows a non-activated state of the actuator 74 in which the arm element 74 does not project beyond the movements/contact plane P defined by the row of rollers 16. As indicated by arrow W, the arm element 74 may further be rotated about the rotationally driven joint 76 towards the locking arrangement 22. This way, the arm element 74 may extend beyond and across the adjacent row of rollers 16 to contact the locking element 58 and exert a pushing force thereon in accordance with the rotational movement W. As a result, the locking element 58 is pushed back into its first position as indicated in FIG. 4. In this context, the locking pin 74 also slides along the housing 56 to then snap back into the opening 66 due to the biasing force of the spring element 68. This way, the locking element 58 is again securely held in its first position.

Note that at a free end of the arm element 74 which directly contacts the locking element 58, a contacting roller 78 is provided for limiting frictional forces between the actuator 74 and the locking element 55.

In general, the second actuator 74 may be provided in any suitable position in which it can reliably operate the locking arrangement 22 without interfering with any loads being locked by the locking arrangement 22. One option is to arrange the actuator 74 at front and/or end faces 80 of the transport vehicle 26 as indicated in FIG. 1, the front and end faces 80 extending substantially orthogonally to the movement axis M. In this context, the locking elements 58 may abut against a sidewall portion and/or lower rim portion of the loads and the second actuator 74 may push the locking elements 58 away from the load without a risk of colliding with the loads.

As a further aspect, the transport vehicle 26 comprises a detection unit 79 in the form of a camera whose field of view is directed towards the opening 66. This way, image data of the opening 66 can be acquired and, in particular, image data which show whether or not the locking pin 64 is arranged therein. This determination is carried out by a processor of computing unit integrated into the transport vehicle 26 by applying known image data evaluation algorithms to the acquired image data. If the locking pin 64 is determined to be no longer received in the opening 66, in particular after the actuator 70 has just been entered into the opening 66 and then again been removed therefrom, it is determined that the locking pin 64 has successfully been released. Accordingly, it is determined that a successful locking operation including a successful release of the fixing element 64 has been initiated. This determination result is communicated wirelessly to a suitable information receiving unit, such as a handheld device for an operator, e.g., in the form of a tablet, smartphone or the like.

Similarly, the same or an additional camera can also monitor whether or not the locking arrangement 22 has been successfully moved back to its non-active state, i.e., whether a successful locking of the locking element 58 in its first position has been initiated by way of the second actuator 74. For doing so, the field of view of the camera may again be directed towards the opening 66 for determining, whether or not the locking pin 64 re-enters the opening 66 after activating the second actuator 74.

Alternatively, the field of view of the at least one camera can also be directed towards an upper region above the row of rollers 16 and, in particular, above the movement/contact plane P. This way, it may be determined whether the locking element 58 extends beyond the plane P or not. Of course, different sensing or information capturing strategies are conceivable which may also include different sensing units apart from optical camera devices.

Figure 6:
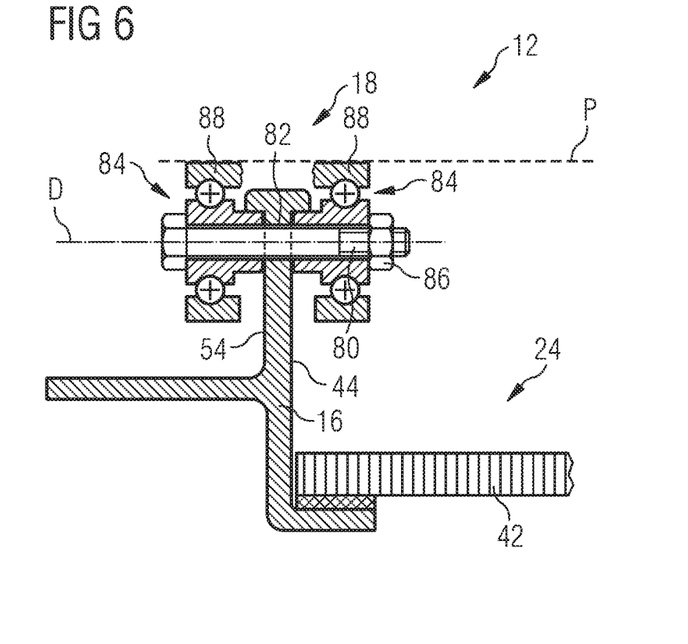
FIG. 6 shows a schematic cross-sectional view of one row of rollers according to FIG. 1 and in particular of a set of rollers arranged thereat.

FIG. 6 shows a schematic cross-sectional view of one row of rollers 16 according to the above embodiment. The cross-sectional plane extends generally in parallel to that of FIGS. 3 and 4, yet further includes one set of rollers 18. In more detail, FIG. 6 again shows the central track or frame member of the row of rollers 16, which supports a set of rollers 18 close to its top portion facing away from the floor area 42 of the guide rail 24. Specifically, a cylindrical bolt member 80 is shown which is received in a through-hole 82 of the central track member of the row of rollers 16. Furthermore, on both sidewall portions 44, 54 of the row of rollers 16, ball bearing units 84 are arranged on the bolt member 80. This assembly is held in place and secured to the row of rollers 16 by tightening a nut 86 at a threaded end of the bolt member 80.

In addition, the ball bearing units 84 each comprise an outer ring 88 which rotates about an axis D coinciding with a longitudinal axis of the bolt member 80. These outer rings 88 also define the movement/contact plane P of the system 12.

Figure 7:
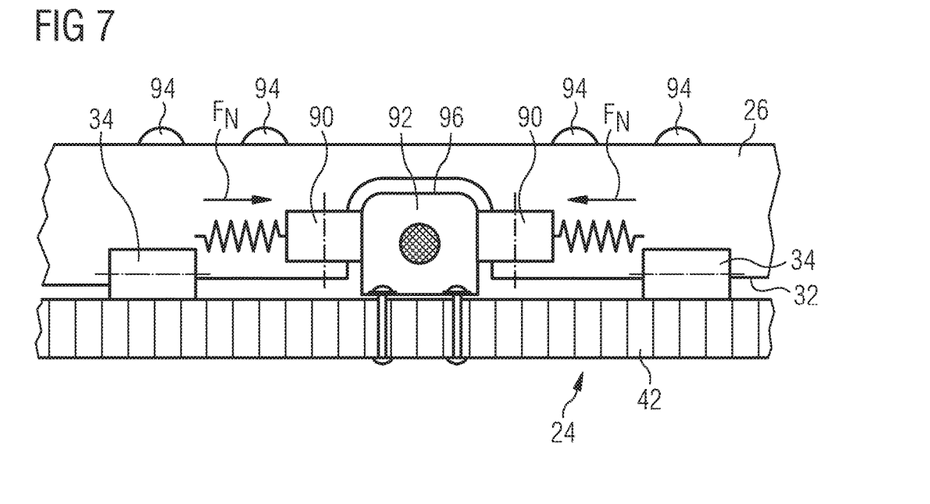
FIG. 7 shows a schematic view of a transport vehicle according to a further embodiment.

In FIG. 7, a transport vehicle 26 according to a further embodiment is shown. The view of the transport vehicle 26 generally corresponds to that of FIG. 2, without, however, including an illustration of the enclosing row of rollers 16. In FIG. 7, the frame 32 of the transport vehicle 26 can again be seen which accommodates non-driven wheels 34 which rest against a floor area 42 of the guide rail 24. Accordingly, the wheels 34 will carry most of the weight of the transport vehicle 26 and/or the forces exerted thereon by directly supporting the vehicle 26 on the floor area 42. On the other hand, a drive unit is provided comprising driven rollers 90 which are spring loaded to abut against a central elongated floor-mounted rail member 92. The rail member 92 generally extends in parallel to and in the middle between the row of rollers 16 as shown in FIG. 1. Accordingly, it defines a movement axis M of the transport vehicle 26 extending generally along the longitudinal axis L of FIG. 1. As a mere option, the rail member 92 further contains a contactless power wire for driving the spring-loaded rollers 90. Also, power for locking and unlocking as well as monitoring or detection operations by a detection unit may be provided in this manner.

Note that for receiving the rail member 92, the transport vehicle 26 comprises a receiving portion 96 which generally extends in a tunnel-like manner along an underside of and through the transport vehicle (i.e., along the movement axis M of FIG. 1). This enables a smooth movement of the vehicle 26 along the rail member 92.

Still further, on an upper surface of the transport vehicle 26, transport units 94 in the form of ball units are shown. These allow for a relative movement between loads along the upper surface of the transport vehicle 26. With reference of FIG. 1, this is useful when loading loads into the cargo hold through the cargo door area 28 and first moving them in a transverse direction (a negative Y-direction of FIG. 1). In this context, the ball units 94 allow for sliding the loads across and transverse to the transport vehicle 26. This transport may also be performed by self-erecting power drive units located in the vehicle 26.

Figure 8:
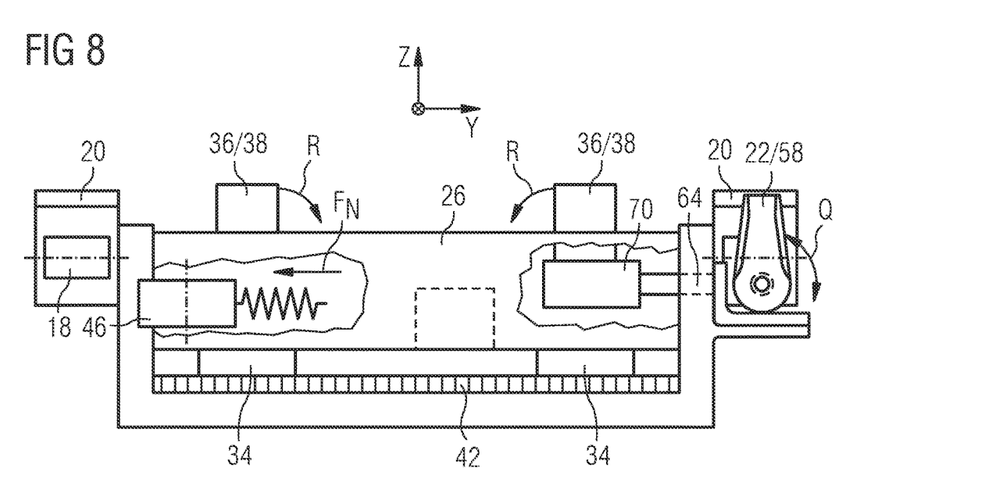
FIG. 8 shows a further view for illustrating a system according a further embodiment.

To conclude with, a view of a transport vehicle 26 according to a further embodiment is shown in FIG. 8, the view being similar to FIG. 2. In this further FIG. 8, the numerous aspects which have previously been discussed by way of separate figures and, e.g., relate to the components of the transport vehicle 26, its actuator 70 as well as the movements of the locking element 58, are summarized in one common figure. Note that the additional arm-actuator 74 of FIG. 5 is again not included in this view.

Figure 9:
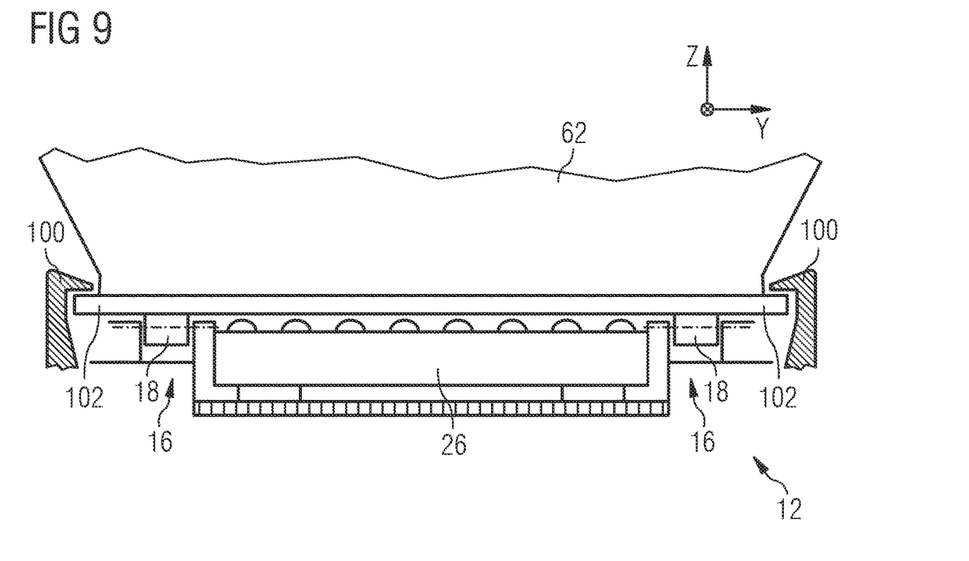
FIG. 9 shows a view for illustrating the function of additional guide members receiving a lower rim portion of a ULD.

Finally, FIG. 9 shows a further option which can be added to the system 12 according to any of the above examples, the option taking the form of elongated track-like guide members 100. These members 100 extend in parallel to the rows of rollers 16 for receiving and guiding an edge portion of a ULD 62 being arranged on the rows of rollers 16. More precisely, the guide members 100, which may also be referred to as YZ-guides or YZ-rails, engage with a lower rim portion 102 of a ULD 62 so as to avoid a movement transversal to the row of rollers. This relates to both of a movement in the Z- as well as in the Y-direction. Note that further details of the system 12, such as the locking arrangement 22 are omitted in the schematic illustration of FIG. 9 but may of course be included therein.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:
1. A system for moving loads, the system comprising:
 a cargo hold floor,
 at least one row of rollers including a plurality of rollers which are integrated into the cargo hold floor one behind another,
 at least one guide rail provided in the cargo hold floor and extending substantially in parallel to the at least one row of rollers,
 at least one transport vehicle removably received in the guide rail and movable along the guide rail and comprising at least one coupling arrangement adapted to selectively couple the transport vehicle with a load arranged on the at least one row of rollers, so that the load is movable in accordance with a movement of the transport vehicle, and
 at least one locking arrangement adapted to, in an active state, lock the load relative to the cargo hold floor and in a non-active state allow a relative movement between the load and the cargo hold floor,
 wherein the transport vehicle is adapted to operate the locking arrangement according to at least one of the following:
  operating the locking arrangement, so that it assumes the active state; and
  operating the locking arrangement, so that it assumes the non-active state,
 wherein the transport vehicle comprises at least one actuator for operating the locking arrangement.

2. The system according to claim 1, wherein said at least one actuator is adapted to operate the locking arrangement in a mechanical manner.

3. The system according to claim 1, wherein the locking arrangement comprises a locking element which is configured to, in the non-active state of the locking arrangement, assume a first position in which it does not interact with the load in a locking manner, and in the active state of the locking arrangement, assume a second position in which it interacts with the load in a locking manner.

4. The system according to claim 3, wherein the locking arrangement further comprises a fixing element configured to at least temporarily fix the locking element in the first position.

5. The system according to claim 3, wherein the locking element is biased into the second position.

6. The system according to claim 4, wherein the at least one actuator of the transport vehicle is configured to operate the fixing element according to at least one of:
   operating the fixing element, so that the fixing element fixes the locking element in the first position; and
   operating the fixing element, so that the fixing element releases the locking element from the first position.

7. The system according to claim 4, wherein the fixing element is arranged at a common height level with a sidewall portion of the guide rail relative to the cargo hold floor.

8. The system according to claim 4, wherein the fixing element is arranged at least partially opposite to an opening in the sidewall portion of the guide rail.

9. The system according to claim 3, wherein the at least one actuator is configured to move the locking element from the second into the first position.

10. The system according to claim 9, wherein the at least one actuator is configured to rest against the locking element.

11. The system according to claim 9, wherein the at least one actuator is also configured to rotate about a rotational axis while moving the locking element from the second into the first position.

12. The system according to claim 1, further comprising a detection unit which enables inferring at least one of a successful locking of the load and a successful unlocking of the load.

13. The system according to claim 1, wherein the transport vehicle and the at least one actuator comprises a first actuator for operating the locking arrangement so that the locking arrangement assumes the active state, and a second actuator for operating the locking arrangement so that the locking arrangement assumes the non-active state.

14. A transport vehicle comprising a system according to claim 1.

15. A method of operating a system for moving loads, the system comprising:
   a cargo hold floor,
   at least one row of rollers including a plurality of rollers which are integrated into the cargo hold floor one behind another,
   at least one guide rail provided in the cargo hold floor and extending substantially in parallel to the at least one row of rollers,
   at least one transport vehicle removably received in the guide rail and movable along the guide rail and comprising at least one coupling arrangement adapted to selectively couple the transport vehicle with a load arranged on the at least one row of rollers, so that the load is movable in accordance with a movement of the transport vehicle, and
   at least one locking arrangement adapted to, in an active state, lock the load relative to the cargo hold floor and in a non-active state allow a relative movement between the load and the cargo hold floor, wherein the transport vehicle comprises at least one actuator for operating the locking arrangement, and
   wherein the method comprises at least one of the following steps:
      operating the locking arrangement by way of the transport vehicle, so that the locking arrangement assumes the active state; and
      operating the locking arrangement by way of the transport vehicle, so that the locking arrangement assumes the non-active state.

16. A system for moving loads, the system comprising:
   a cargo hold floor,
   at least one row of rollers including a plurality of rollers which are integrated into the cargo hold floor one behind another,
   at least one guide rail provided in the cargo hold floor and extending substantially in parallel to the at least one row of rollers,
   at least one transport vehicle removably received in the guide rail and movable along the guide rail and comprising at least one coupling arrangement adapted to selectively couple the transport vehicle with a load arranged on the at least one row of rollers, so that the load is movable in accordance with a movement of the transport vehicle,
   at least one locking arrangement adapted to, in an active state, lock the load relative to the cargo hold floor and in a non-active state allow a relative movement between the load and the cargo hold floor,
   wherein the transport vehicle is adapted to operate the locking arrangement according to at least one of the following:
      operating the locking arrangement, so that it assumes the active state; and
      operating the locking arrangement, so that it assumes the non-active state, and
   a detection unit which enables inferring at least one of a successful locking of the load and a successful unlocking of the load.

* * * * *